July 17, 1956   T. BROWN   2,754,738
DRAFT DEVICE

Filed April 12, 1951   3 Sheets-Sheet 1

INVENTOR.
THEOPHILUS BROWN
BY
C. Parker R C Johnson
ATTORNEYS

July 17, 1956

T. BROWN 2,754,738

DRAFT DEVICE

Filed April 12, 1951

INVENTOR.
THEOPHILUS BROWN
BY
ATTORNEYS

July 17, 1956  T. BROWN  2,754,738
DRAFT DEVICE
Filed April 12, 1951  3 Sheets-Sheet 3

INVENTOR.
THEOPHILUS BROWN
BY
ATTORNEYS

United States Patent Office 2,754,738
Patented July 17, 1956

2,754,738

DRAFT DEVICE

Theophilus Brown, Moline, Ill., assignor to Deere & Company, Moline, Ill., a corporation of Illinois Application April 12, 1951, Serial No. 220,659

15 Claims. (Cl. 97—46.07)

The present invention relates generally to farm implements and is more particularly concerned with hitch devices for connecting a ground-working implement with a tractor or other propelling and/or supporting means whereby a desired depth of operation may be secured and maintained under various conditions of operation.

The object and general nature of the present invention is the provision of a new and improved hitch means that provides a relatively free floating action between the implement and the tractor during operation and in which the depth of operation may readily be varied in response to changes in the amount or magnitude of the draft of the implement, or the force required to propel the implement through the ground in its operating position. The amount of draft of an implement will vary with variations in a number of factors, such as the depth of operation, character of the soil, amount of moisture therein, previous treatment of the soil etc., but, generally speaking, the factor of most importance is the depth of operation of the ground-working tool means.

An important feature of the present invention is the provision of an implement, such as a plow or the like having suction, that is, a tendency to penetrate the soil, due principally to the shape of the tool which is such that in operation there is a downward component of force created by the soil pressure acting against the tool, which component of force tends to cause the tool to move downwardly into the soil until the forces involved come into equilibrium, as by the creation of an upward component of force of substantially equal magnitude, arising usually from an upwardly and forwardly extending line of draft, in connection with means responsive to the amount of draft for changing the hitch point of the implement, preferably in such a way that when the amount of draft increases the hitch point is raised, thereby acting upon the implement to cause the tool means thereof to operate at a more shallow depth of operation. A further and important feature of this invention is the provision of hitch means of this type which is so constructed and arranged as to provide for relatively free vertical floating movement between the implement and the tractor at all times during operation, whereby the implement is not bodily raised and lowered by the tractor when the latter passes over uneven terrain or the like.

Still further, an important feature of the present invention is the provision of hitch means of the vertically swingable link type, which affords a forward virtual hitch point, with means responsive to variations in the amount of draft for raising or lowering the effective hitch point, and thereby decreasing or increasing the depth of operation without interfering with the normally free vertical movement of the implement relative to the tractor about the aforesaid virtual hitch point. In this connection it is a further feature of the present invention to provide hitch mechanism of the type in which a power operated part on the tractor is actuated by draft-responsive means through one range of operation and by manually operated means during another range of operation, the manually operated means acting to raise the implement into its transport position irrespective of the position of the draft-responsive means.

Still another feature of the present invention is the provision of hitch means for a ground-working implement so constructed and arranged that, when lowering the implement from a transport position into its ground-working position, the tool means quickly penetrates the ground and quickly reaches the desired depth of operation without requiring an excessive amount of forward travel. According to the present invention, this is preferably accomplished by a combination of draft-responsive control and manual control, the manual control being shifted into a position corresponding to maximum depth of operation, for the purpose of facilitating quick penetration, after which the manual control may be moved back to a position corresponding to the desired depth of operation, after which the tool is maintained substantially at that depth of operation by virtue of the draft-responsive control operating to change the hitch connections so as to increase or decrease the depth of operation but without interfering with the generally free floating movement of the implement relative to the tractor.

These and other objects and advantages of the present invention will be apparent to those skilled in the art after a consideration of the following detailed description, taken in conjunction with the accompanying drawings, in which.

Figure 1:
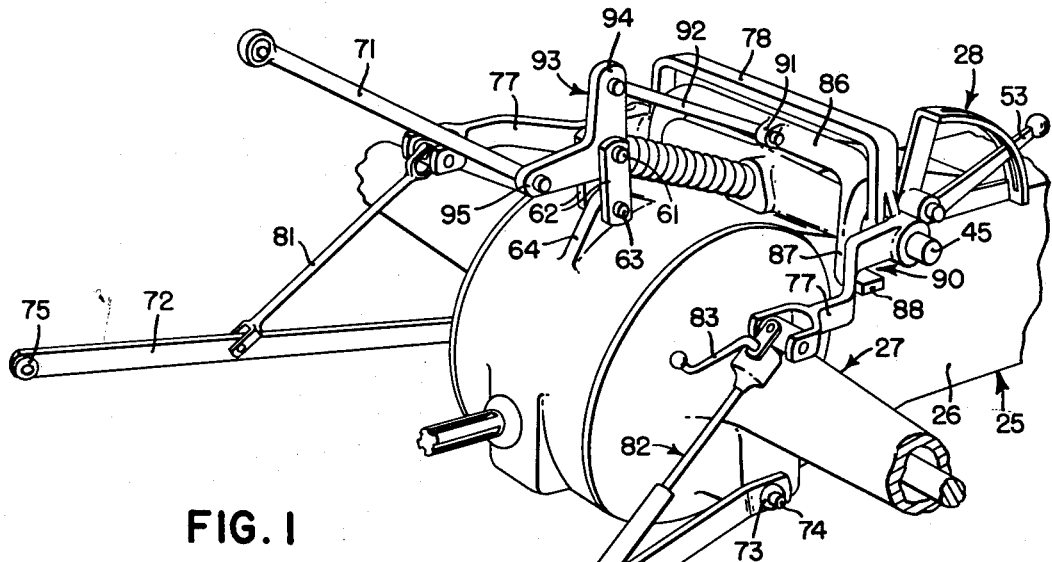
Figure 1 is a fragmentary perspective view showing hitch mechanism for connecting an implement to a tractor, in which the principles of the present invention have been incorporated.
Figure 2:
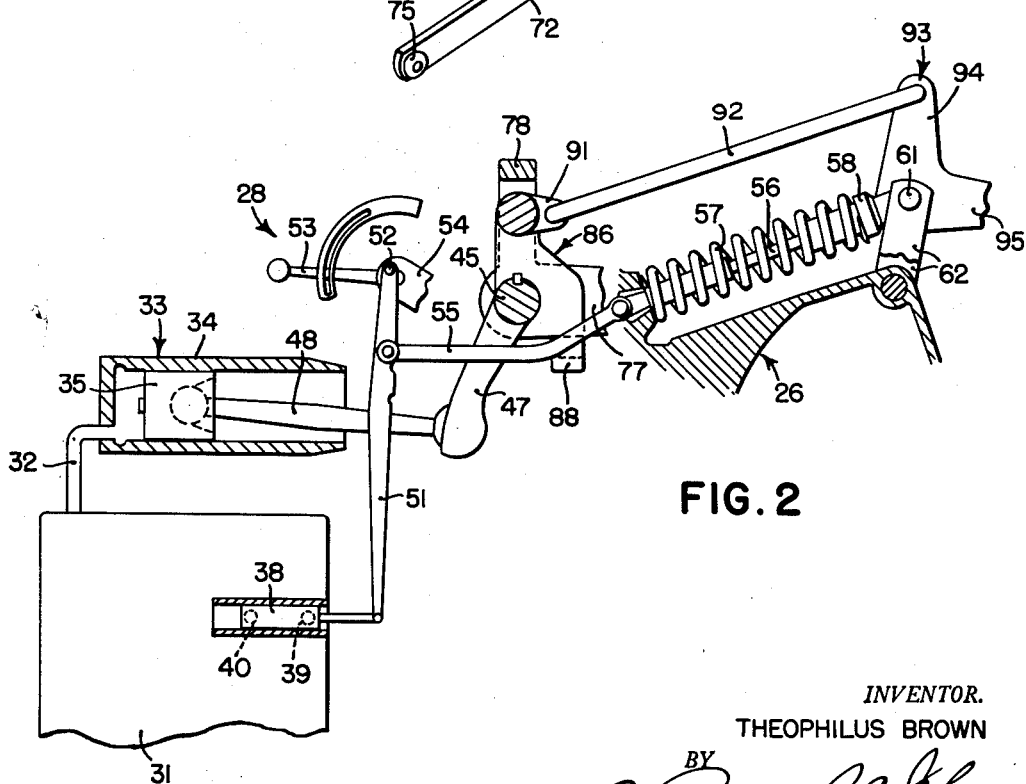
Figure 2 is a generally diagrammatic view, showing the controllable power-actuated mechanism of a well-known farm tractor, with which the present invention is particularly adapted to cooperate.
Figure 3:
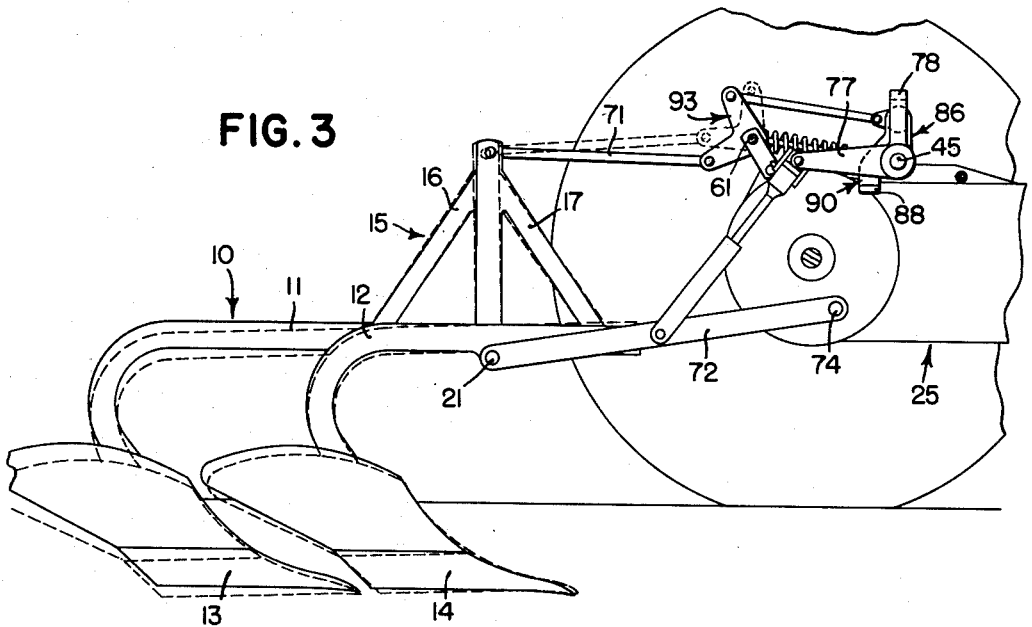
Figure 3 is a side view of a two-bottom plow and the rear portion of the propelling tractor, the plow and associated parts being shown in a normal operating position for fairly deep plowing.

Referring first to Figures 1, 2 and 3, the principles of the present invention have been shown as embodied in a tractor-carried plow. The plow is indicated in its entirety by the reference numeral 10 and comprises a frame or frame means that includes beams 11 and 12, connected together by suitable cross bracing and carrying plow bottoms 13 and 14, and an upwardly extending superstructure 15 in the form of a pair of A-shaped brackets 16 and 17, the upper portions of which converge to form a pair of apertured lugs 18 in which a pivot member 19 is carried. The plow frame also carries a pair of laterally outwardly extending, right- and left-hand attaching studs 21.

The tractor, which is shown fragmentarily at 25 and which generically represents any suitable form of mobile support, is substantially like that shown in U. S. Patent 2,356,231 to H. G. Ferguson, issued August 22, 1944, and comprises a tractor body 26 which includes a rear axle structure 27 and a power plant from which energy is derived for actuating a power lift unit 28. As shown in Figure 2, the power lift unit 28 comprises a pump 31 adapted to deliver fluid under pressure through a conduit 32 to a one-way hydraulic unit 33, the latter including a cylinder 34 and a piston 35 therein. A valve 38 controls the operation of the pump, as by controlling an inlet port 39 on the suction side of the pump and an outlet port 40 which opens the pump and the conduit 32 to the sump that surrounds the pump 31. A rockshaft 45 is mounted for rocking movement on the rear portion of the tractor body 26 and, within the latter, has an arm 47 operatively connected through a connecting rod 48 with the piston 35. The rockshaft 45 constitutes a power operated part available for adjusting implements or the like. A valve lever 51 is connected at its lower end with the valve 38 and at its upper end is pivotally connected to an eccentric 52 which is carried on a shaft controlled by a valve control arm 53 that is supported for rocking movement on a part 54 of the tractor housing. Between its lower end and the eccentric 52 the valve lever 51 is connected by a rod 55 to a plunger 56 which is biased for outward movement by a spring 57 acting at one end against a head 58 carried at the outer end of the plunger 56 and acting at its inner end against a portion of the tractor housing 26. The head 58 is pivotally mounted by a pin 61 on a pair of fore-and-aft swingable links 62 supported, as at 63, on a lug 64 forming a part of the rear axle structure. The plunger 56 and spring 57, together with the hydraulic pump 31, the hydraulic ram unit 33, and associated connections, comprise a spring biased, draft-responsive control means for rocking said shaft 45, and such control means also includes the valve lever 51 and the hand lever 53, by which the responsiveness of the control means may be adjusted as desired.

The parts are shown in Figure 2 in the positions they occupy when the plow is working, as in Figure 3.

The implement 10 is connected with the tractor 25 for generally free vertical floating movement through draft-transmitting means in the form of upper and lower links 71 and 72. There are two lower links 72, each universally connected, as at 73, to a laterally outwardly extending stud 74 carried by the lower portion of the rear axle housing 27. The rear ends of the lower or tension links 72 have ball and socket means 75 arranged to receive the right- and left-hand studs 21 extending laterally outwardly of the plow frame. Thus, considering the upper and lower links 71 and 72 as an implement-tractor connecting entity, the draft-responsive means is located between a portion of such entity and the tractor so as to respond to variations in the draft force, and in so responding the draft-responsive means actuates the hydraulic unit 33 and changes the position of the implement.

The ends of the power lift actuated rockshaft 45 extend laterally outwardly of the associated housing, and a pair of lift arms 77, rigidly interconnected so as to rock together by a transverse arch section 78, are mounted for rocking movement on the rockshaft 45. The left-hand arm 77 is connected through a lifting link 81 with the left-hand tension link 72, and the right-hand arm 77 is connected through an adjustable lifting link 82 with the right-hand tension link 72. The adjusting mechanism of the link 82 includes a handle 83 and associated screw-threaded parts by virtue of which turning the handle 83 in one direction or the other has the effect of increasing or decreasing the effective length of the link 82, thereby raising or lowering one of the tension links 72 relative to the other. The links 72 are constrained to swing vertically together by virtue of the arch member 78 rigidly interconnecting the two lift arms 77.

Figure 4:
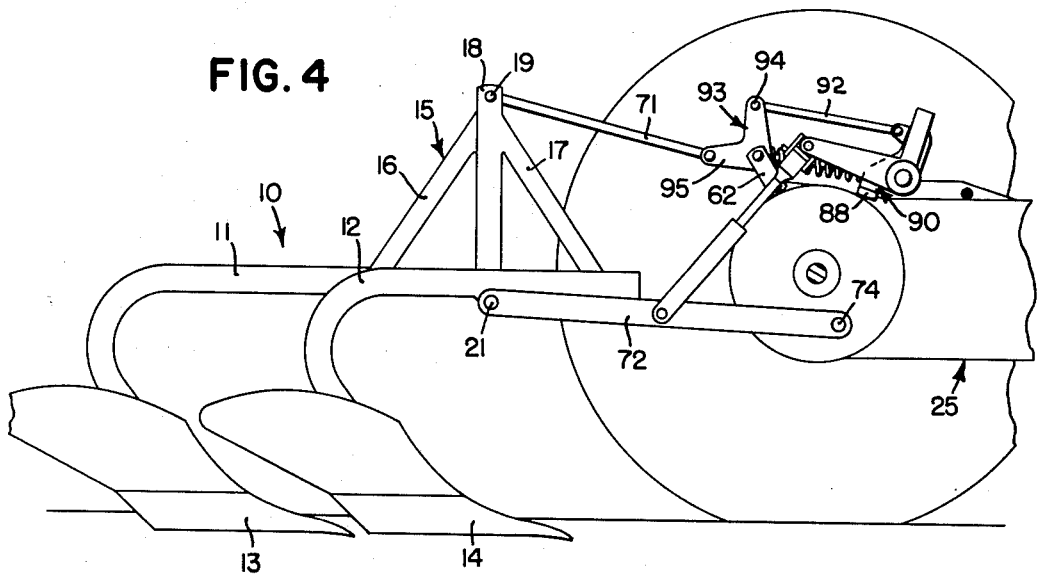
Figure 4 is a view similar to Figure 3, showing the parts in the positions they occupy when operating at a shallow plowing depth, with the hitch point in a lower position as compared with the position of the hitch point in Figure 3.
Figure 5:
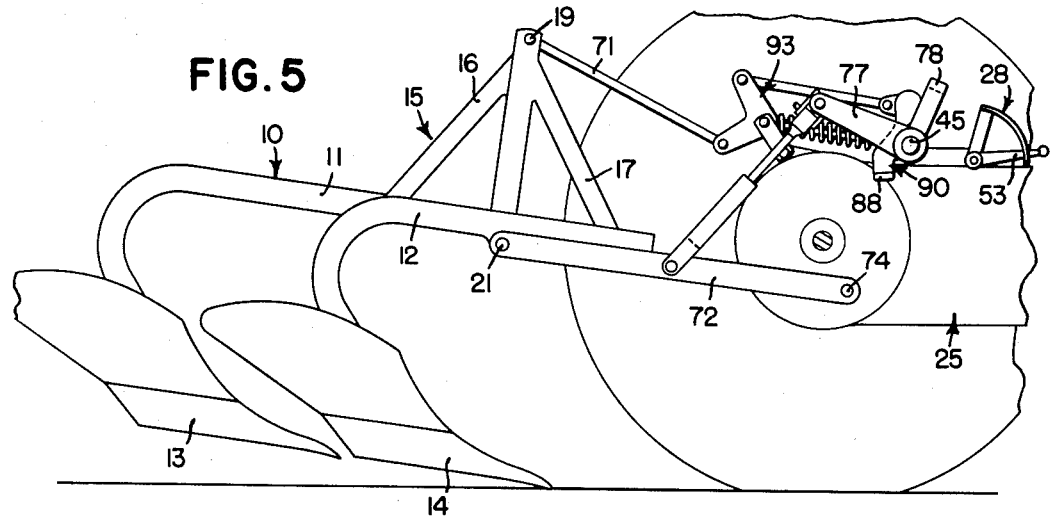
Figure 5 shows the plow in the position it occupies when entering the ground, illustrating how the hitch device of the present invention provides for quick penetration.

A yoke 86 is rigidly fixed by any suitable means to the rockshaft 45, the yoke 86 having a central portion which spans the tractor housing and end portions 87 that terminate in laterally outwardly directed parts 88 which underlie the associated lift arms 77, there being a space 90 between the lugs 88 and the associated arms 77 in all working positions of the implement, as shown in Figures 3, 4 and 5. Centrally, the yoke 86 carries an apertured lug 91 which is connected by a link 92 to lever means in the form of a bell crank 93 having upper and rear arms 94 and 95. The rearwardly extending arm 95 is apertured to receive the forward end of the depth-adjusting or control link 71, the rear end of which is apertured to receive the upper pivot 19 of the plow frame structure 15. The bell crank 93, which is one form of motion-transmitting means, is mounted for rocking movement on the pivot 61 by which the head 58 of the plunger 56 is pivotally supported on the swinging links 62 and the yoke 86 and link 92 serve to connect the bell crank 93 with the power operated rockshaft 45.

The operation of the invention described above is substantially as follows. The implement 10 is connected to the tractor links 71 and 72 by backing the tractor into position and slipping the ball connectors 75 into position over the studs 21, holding the connectors in position against displacement by cotters or the like. The upper bracket 18 is connected to the rear end of the link 71 by inserting the connecting pin 19 through the aperture in the rear end of the link 71. When the outfit is in normal operation, the plow 10 is capable of relatively free floating movement in a generally vertical direction relative to the tractor about a virtual hitch point which is defined as the point of intersection of lines passing through and extended forwardly of the upper and lower links 71 and 72. Pressure of the soil against the plow bottoms 13 and 14 creates tension in the lower links 72, the tendency being for the implement 10 to rock about the pivot studs 21 in a clockwise direction as viewed in Figure 3. Such movement is, however, resisted by the link 71, which acts in compression against the arm 95 of the bell crank 93, the force being such as to tend to rock the rockshaft 45 in a counterclockwise direction (clockwise as viewed in Figure 2), but such movement is prevented by virtue of the fact that the valve 38 is at this moment in a position closing both the inlet and outlet openings 39 and 40 and thereby locking the fluid in the cylinder 34, thus preventing any inward or leftward (Fig. 2) movement of the piston 35. Therefore, under these conditions the forwardly directed forces acting through the link 71 are imposed on the bell crank 93, which, in turn, tends to move the plunger 56 inwardly against the bias of the spring 57. The amount of force transmitted through the link 71 and the bell crank 93 to the spring 57 is proportional to the draft of the plow, and unless the forces become excessive, the spring 57 is strong enough to prevent any inward movement of the rod 55 (Figure 2). Therefore, when the valve control arm 53 is moved downwardly, the eccentric 52 is shifted so as to swing the valve lever 51 in a counterclockwise direction (Figure 2) an amount sufficient to open the outlet 40. This releases the fluid within the cylinder 34, whereupon the piston 35 moves forwardly substantially the entire distance toward the inner end of the cylinder 34, permitting a clockwise rocking (Figure 2) of the shaft 45 to substantially its terminal position in this direction. As soon as the point of the forwardmost plow bottom contacts the ground, assuming that the tractor is moving forwardly, the plow tilts into substantially the position shown in Figure 5, since there is no resistance against the forward movement of the link 71 or the counterclockwise movement (Figure 1) of the bell crank 93, the piston 35 being freely movable to the inner end of the cylinder 34. Since the plow bottoms are tilted downwardly they readily and quickly penetrate the ground and readily reach a depth of operation such that there is sufficient draft reaction transmitted through the bell crank 93 to the plunger 56 so that the spring 57 is compressed. This causes the lever 51 to swing forwardly (to the left as viewed in Figure 2) about the eccentric 52 as a center, closing the outlet 40, which immediately prevents any further inward movement of the piston 35, since the fluid is hydraulically locked in the inner end of the cylinder. If the draft reaction should increase to the point where the spring 57 is compressed further, the resulting inward movement of the rod 55 will move the valve 38 so as to uncover the pump inlet 39, whereupon the pump will force fluid under pressure into the inner end of the cylinder 34, thereby forcing the piston 35 outwardly. This causes the rockshaft 45 to rock in a counterclockwise direction (Figure 2) which acts through the yoke member 86 and the link 92 to rock the bell crank 93 in a clockwise direction as viewed in Figures 1 and 3. The yoke 86 therefore constitutes a movable member actuated by the draft-responsive means for imparting an upward and rearward movement to the front end of the link 71, the generally rearward component of movement thus imparted to the link 71 acting to tilt the plow in a counterclockwise direction, as viewed in Figure 3, thereby causing the plow to move into a position of reduced depth of plowing, whereupon the draft reaction decreases slightly, sufficient to permit the spring 57 to expand to a point of closing the inlet 39. As soon as the inlet 39 is closed the fluid is locked in the cylinder 34 and no further movement imparted to the bell crank 93. This is the normal state of equilibrium, and in this position, as will be seen from either Figure 3 or Figure 4, the plow is now free to swing generally vertically without restraint about the virtual hitch point defined by the upper and lower links 71 and 72 within the limits of the space 90 between the lift lugs 88 and the lift arms 77. This permits the plow to seek its own level operating position in which it remains, subject only to a repositioning of the bell crank in response to changes in the draft reaction imposed on the spring 57 through the link 71 and the bell crank 93. At any time, however, the valve control arm 53 may be shifted so as to actuate the control mechanism of Figure 2 to cause the bell crank 93 to be rocked in either one direction or the other, depending on whether it is desired to increase or decrease the depth of operation. The above-mentioned upward movement of the front end of the link 71, resulting from a clockwise rocking of the bell crank 93, serves in effect to raise the effective line of draft between the tractor and the implement, which facilitates stable operation at the reduced depth.

Figure 6:
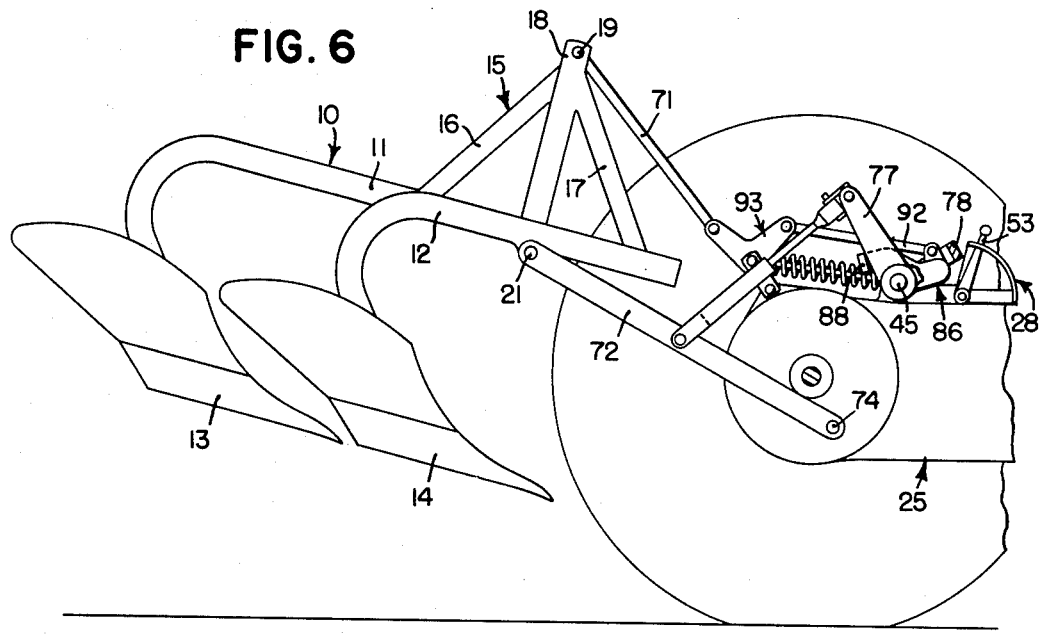
Figure 6 shows the positions of the parts when the plow is raised into a transport position.

In order to lift the plow from a normal operating position into a transport position, all that it is necessary to do is to move the valve control arm 53 into its rear or uppermost position. This opens the pump inlet 39 and causes the pump to force fluid under pressure into the cylinder 34, irrespective of the draft reaction imposed on the spring 57, which extends and rocks the yoke 86 and bell crank 93 in a clockwise direction (Figure 3). This acts to shift the link 71 rearwardly, tilting the plow backwardly, as indicated in dotted lines in Figure 3, until the lost motion, indicated at 90, is taken up. After this occurs, the lift lugs 88 engage the lift arms 77, the latter then acting through the lower tension links 72 to swing the plow into its elevated position, as shown in Figure 6. The lugs 88, with associated parts, thus form means that is connected with the frame tilting member 86 to be actuated thereby and which has a lost-motion connection, through space 90, with the lift arms 77 and, through the latter and the lift links 81 and 82, with the lower links 72.

It will be noted, particularly from Figure 1, that after the lost-motion 90 has been taken up, continued movement of the rockshaft 45 in the raising direction rocks the bell crank 93 in a direction to raise the front end of the link 71, and this acts to tip the plow backwardly, thus raising the points and facilitates exit of the plow from the ground. The converse takes place when lowering the plow into plowing position; that is, the bell crank is swung in the other direction, lowering the front end of the link 71 and facilitating rapid entry of the plow bottoms.

While I have shown and described above the preferred structure in which the principles of the present invention have been incorporated, it is to be understood that my invention is not to be limited to the exact details shown and described above but that, in fact, widely different means may be employed in the practice of the broader aspects of my invention.

What I claim, therefore, and desire to secure by Letters Patent is:

1. For use with a tractor having a power operated adjusting part, control means for shifting said part, and a pair of tension links connected at their forward ends with the tractor: the improvement comprising an agricultural implement including a frame carrying ground-working tool means having suction, means pivotally connecting said frame with the rear ends of said tension links, a bell crank adapted to be pivotally connected with said control means, an upper link pivotally connected at its rear end with the upper portion of said implement frame and at its forward end with one arm of said bell crank, and means separate from said tension links connecting the other arm of said bell crank with said power operated adjusting part, whereby draft reaction transmitted from said implement frame to said one arm of said bell crank acts through said control means for shifting said power operated adjusting part, and movement of the latter acting through said bell crank for shifting said upper link and varying the position of said implement frame so as to increase or decrease the amount of suction in said tool means independently of said tension links.

2. For use with a tractor having a power lift rockshaft, and controllable power operated mechanism for causing rocking of said shaft, the improvement comprising a ground-working implement adapted to operate at different depths, hitch means including upper and lower generally longitudinally extending links for swingably connecting said implement with the tractor, means including one of said links for connecting said implement with said controllable power operated mechanism for causing rocking of said rockshaft in accordance with changes in the draft of said implement during operation, means connected between said rockshaft and said upper link for raising or lowering the connection between the latter and the tractor in response to changes in the draft of said implement, and means connected with the rockshaft to be operated by movement thereof and having a lost-motion connection with certain of said links for raising the implement after the connection between the upper link and the tractor has been raised.

3. In a tractor adapted to receive ground-working implements, the combination of a controllable power lift unit, a rockshaft operated thereby, a spring-biased member connected to control said unit, a bell crank mounted on said member and having two arms, motion-transmitting means connecting one of said bell crank arms with said rockshaft, upper and lower hitch links, means connecting the forward end of the upper link with the other arm of said bell crank, means connecting the forward end of the lower link with the tractor, and a lost-motion connection between said rockshaft and said lower link.

4. In a tractor adapted to receive ground-working implements, the combination with upper and lower hitch links at the rear of the tractor, a controllable power lift unit, a rockshaft operated thereby and a spring-biased member connected to control said unit, of a bell crank adapted to be mounted on said member and having two arms, motion-transmitting means adapted to connect one of said bell crank arms with said rockshaft, means for connecting the other bell crank arm with the forward end of the upper link, and a lost-motion connection adapted to interconnect said rockshaft with the lower link.

5. In a tractor adapted to receive ground-working implements, the combination of a controllable power lift unit, a rockshaft operated thereby, a spring-biased member connected to control said unit, upper and lower hitch links, a lost-motion connection between said rockshaft and said lower link, means connecting the forward end of one of said links with said spring-biased member so as to impose the implement draft thereon, a member mounted for rocking movement on the tractor and including an arm connected with the forward end of said upper link, and motion-transmitting means connecting said arm member with said rockshaft to be operated thereby.

6. In a tractor adapted to receive ground-working implements, the combination of a controllable power lift unit, a rockshaft operated thereby, a spring-biased member connected to control said unit, upper and lower hitch links, a lost-motion connection between said rockshaft and one of said links, means connecting the forward end of one of said links with said spring-biased member so as to impose the implement draft thereon, a member mounted for rocking movement on the tractor and including an arm connected with the forward end of one of said links, and motion-transmitting means connecting said arm member with said rockshaft to be operated thereby.

7. In a tractor adapted to receive ground-working implements, the combination of a controllable power lift unit, a rockshaft operated thereby, upper and lower generally longitudinally extending link means, means at the rear ends of said link means to receive a ground-working implement, lift means connecting the intermediate portion of said lower link means with said rockshaft to be lifted by operation of said rockshaft, a first means on the tractor to movably receive the forward end of said upper link means, a second means on the tractor to movably receive the lower link means, one of said first and second means including a link-receiving part having a generally vertical component of movement, and force-transmitting means additional to the lift means and directly connecting said part with said rockshaft independently of the links for transmitting movement of the rockshaft to said part, whereby the associated link means is shifted generally vertically whenever said rockshaft is actuated to raise the lower link means.

8. In a tractor adapted to receive ground-working implements, the combination of a controllable power lift unit, a rockshaft operated thereby, an upper link, a pair of generally laterally spaced apart lower links, means at the rear ends of said links to receive a ground-working implement, lift means connecting the intermediate portions of said lower links with said rockshaft to be lifted by operation of said rockshaft, a first means on the tractor to movably receive the forward end of said upper link, a second means on the tractor to movably receive the forward ends of the lower links, one of said first and second means including a link-receiving part having a generally vertical component of movement, and force-transmitting means additional to the lift means and directly connecting said part with said rockshaft independently of the links for transmitting movement of the rockshaft to said part, whereby the link receiving portion of said part is shifted generally vertically whenever said rockshaft is actuated to shift said lower links, said part being shifted upwardly when said lower links are raised and downwardly when said lower links are lowered.

9. In a tractor adapted to receive ground-working implements, the combination of a controllable power lift unit, a rockshaft operated thereby, an upper link, a pair of generally laterally spaced apart lower links, means at the rear ends of said links to receive a ground-working implement, lift means connecting the intermediate portions of said lower links with said rockshaft to be lifted by operation of said rockshaft, a first means on the tractor to movably receive the forward end of said upper link, a second means on the tractor to movably receive the forward ends of the lower links, said first means including a link-receiving part having a generally vertical component of movement, and force-transmitting means additional to the lift means and directly connecting said part with said rockshaft independently of the lower links for transmitting movement of the rockshaft to said part, whereby the forward end of said upper link is shifted generally vertically whenever said rockshaft is actuated to shift the lower links.

10. An agricultural implement adapted to be connected with a mobile support, comprising frame means, a ground-working tool carried by the frame means, means affording an implement-support-connecting entity for connecting said frame means with said support for generally free vertical floating movement relative thereto, draft-responsive means disposed between a portion of said connecting entity and said support, a movable member connected with said frame means for tilting the latter in a generally fore-and-aft extending plane, means actuated by said draft responsive means and connected with said movable member for tilting the frame means in said plane in response to variations of draft imposed on said draft responsive means, and lift means interconnecting the frame tilting means and the aforesaid entity for lifting the frame means relative to the support to a transport position, said lift means including a lost-motion connection affording tilting of said frame means prior to lifting thereof.

11. For use with a tractor having a power operated adjusting part, control means for shifting said part, and a pair of tension links connected at their forward ends with the tractor: the improvement comprising an agricultural implement including a frame carrying ground working tool means having suction, means pivotally connecting said frame with the rear ends of said tension links, a bell crank adapted to be pivotally connected with said control means, an upper link pivotally connected at its rear end with the upper portion of said implement frame and at its forward end with one arm of said bell crank, means connecting the other arm of said bell crank with said power operated adjusting part, a pair of interconnected arms connected with said tension links, and means having lost motion and adapted to act between said power operated adjusting part and said arms for engaging the latter and acting through said links for raising said tool means out of engagement with the ground.

12. The invention set forth in claim 11, further characterized by said tractor having manually operated adjusting means connected to shift said power operated adjusting part irrespective of the position of said control means, said control means being activated to act through the bell crank when the lost-motion means are not spaced as in lifting.

13. For use with a tractor having a power operated adjusting part, control means for shifting said part, and tension link means connected at its forward end with the tractor: the improvement comprising an agricultural implement including a frame carrying ground-working tool means having suction, means pivotally connecting said frame with the rear end of said tension link means, lever means pivotally connected with said control means, an upper link pivotally connected at its rear end with the upper portion of said implement frame and at its forward end with said lever means and means separate from said tension link means and connecting said lever means with said power operated adjusting part, whereby draft reaction transmitted from said implement frame to said lever means acts through said control means to shift said power operated actuating part, and movement of the latter acts through said lever means to shift said upper link for varying the position of said implement frame so as to increase or decrease the amount of suction in said tool means independently of said tension link means.

14. An agricultural implement adapted to be connected with a tractor having a controllable power operated part, said implement including a ground-working tool, upper and lower generally forwardly converging links connecting said tool with the tractor for generally free vertical swinging movement relative to the tractor about a forwardly disposed virtual hitch point, draft responsive means interposed between certain of said links and the tractor for controlling the power operated part, means for raising the point of connection of one of said links with the tractor, means connecting said link raising means with said power operated part, and means connecting said draft responsive means with said power operated part for causing the latter to shift the point of connection of said one link with the tractor upwardly in response to an increase in the draft of said tool, said power operated part having a lost-motion connection with one of said links, and said lost-motion connection including relatively movable parts adapted to come into contact after said point of link connection has been raised at least partially, whereby subsequent operation of said power operated part serves to raise said tool into a transport position.

15. For use with a ground-working implement adapted to be connected with a tractor having a power operated device and control means therefor, the improvement which includes hitch means for connecting the implement to the tractor, which comprises upper and lower link means, means for connecting said upper and lower link means with the implement and the tractor, one of said link means being connected to move in a generally fore-and-aft direction relative to the tractor, said connecting means including a draft-responsive device having a part movable in response to changes in the draft, and a member adapted when moved to shift said one link means in a generally fore-and-aft direction to tilt the implement in a vertical longitudinal plane relative to the tractor, means for connecting said movable part with said power control means for operating said tractor power operated device in response to changes in the draft, and means for connecting said member with said device whereby said implement is tilted in said plane when said draft changes.

References Cited in the file of this patent

UNITED STATES PATENTS

| | | |
|---|---|---|
| 2,356,231 | Ferguson | Aug. 22, 1944 |
| 2,440,550 | Martin | Apr. 27, 1948 |
| 2,455,727 | Bunting | Dec. 7, 1948 |
| 2,515,637 | Dooley et al. | July 18, 1950 |
| 2,611,306 | Strehlow et al. | Sept. 23, 1952 |
| 2,631,514 | Roeder | Mar. 17, 1953 |
| 2,665,622 | Bunting | Jan. 12, 1954 |